United States Patent [19]

Hendershot

[11] Patent Number: 5,111,095

[45] Date of Patent: May 5, 1992

[54] POLYPHASE SWITCHED RELUCTANCE MOTOR

[75] Inventor: James R. Hendershot, Hillsboro, Ohio

[73] Assignee: Magna Physics Corporation, Hillsboro, Ohio

[21] Appl. No.: 619,057

[22] Filed: Nov. 28, 1990

[51] Int. Cl.⁵ .............................................. H02K 19/20
[52] U.S. Cl. .................................................... 310/168
[58] Field of Search ............ 310/168, 257, 263, 49 R, 310/162, 163, 164, 179, 193, 269, 209

[56] References Cited

U.S. PATENT DOCUMENTS

| 3,866,104 | 2/1975 | Heine | 310/49 R |
| 4,794,511 | 12/1988 | Lundin | 310/168 |
| 4,883,999 | 11/1989 | Hendershot | 310/254 |
| 4,995,159 | 2/1991 | Hancock et al. | 29/596 |

Primary Examiner—Steven L. Stephan
Assistant Examiner—E. To
Attorney, Agent, or Firm—Leydig, Voit & Mayer

[57] ABSTRACT

A switched reluctance motor driven by a polyphase source includes a stator having a yoke and a plurality of evenly spaced salient poles distributed about the yoke and a rotor mounted for rotation relative to the stator having a plurality of unevenly spaced salient poles. The geometry of the stator and rotor is such that each of the stator poles is separated from an adjacent stator pole by an angle $\alpha_1$ and the poles of the rotor are alternately spaced from adjacent rotor poles by angles $\alpha_1$ and $\alpha_2$. Windings associated with the poles of the stator are connected to be driven by a polyphase source such that two phases of the source are energized simultaneously. The simultaneous energization of two phases results in pairs of adjacent stator poles being magnetized with opposite polarity, thereby forming a magnetic circuit whose path includes only the portion of the yoke bridging the two adjacent stator poles of a pair. The motor of the invention provides substantially improved torque performance relative to a conventional switched reluctance motor of the same size, while also providing improved efficiency.

11 Claims, 8 Drawing Sheets

POLYPHASE SWITCHED RELUCTANCE MOTOR

FIELD OF THE INVENTION

This invention generally relates to brushless D.C. motors and, more particularly to switched reluctance or variable reluctance motors that have their phase windings commutated electronically without the use of mechanical brushes or commutators. These types of brushless D.C. motors produce continuous rotational torque without the use of permanent magnets. The required phase commutation can be accomplished utilizing the position of the rotor as determined by a position sensor such as an encoder or a resolver mounted to the shaft of the motor.

BACKGROUND OF INVENTION

Because of recent developments in power semiconductor devices such as power MOSFETS and IGBTs, the proliferation and usage of brushless D.C. motors has intensified in recent years. Their applications are centered around either variable/adjustable speed or servo positioning systems. The availability of high energy permanent magnets such as samarium cobalt or neodymium boron iron has also contributed to the current interest in brushless D.C. motors. Due to the high cost of these high energy magnets and mechanical difficulties of retaining them in mountings, however, there has also been a keen interest in the class of brushless D.C. motors that do not use permanent magnets or windings in connection with the rotating member. This class of brushless D.C. motors is commonly called switched reluctance motors or simply SR motors.

SR motors have been used extensively as stepping motors when driven by a series of clock pulses in an open loop manner such that they provide a commutation frequency and phase that is without regard to the angular position of the rotor. In these stepping motor systems, the motor has typically been referred to as a VR motor, where the "VR" is an acronym for the phrase "variable reluctance". Many of these so-called VR stepping motors are either three-phase or four-phase machines with laminated designs that include many teeth on each rotor and stator magnetic pole. These teeth are required to achieve small step angles. (e.g., U.S. Pat. No. 3,866,104 to Heine).

The subject of this invention has to do with a continuously rotating reluctance machine or SR motor that is not designed to be used as a stepping motor and controlled in an open-loop fashion. The SR motor in general is designed to convert electrical energy into a continuous mechanical rotation. This means that the SR motor is called upon to produce continuous torque at any desired, preset or controllable speed of rotation.

SR motors of the type described herein usually have stators wound with either three, four or five phases. Each phase is energized or connected to a DC power source and commutated or switched at the optimum position of the rotor, so as to produce the maximum output torque per phase. Torque variation or torque ripple can be minimized by careful commutation utilizing two phases energized at a time so the added torque of each adjacent phase approximately equals the peak torque for conventional SR motors although normally commutated with unipolar DC voltage with one phase on at a time. Although not a requirement, SR motors do not normally have multiple teeth per pole in their lamination designs but usually single poles for each coil. Two or three teeth per pole might be used occasionally but seldom more.

The SR machine is a very robust or rugged motor with a very simple rotor construction and an extremely compactly wound stator, which yields the lowest potential manufacturing cost of any motor known. They are well suited to heavy duty use in the most severe of environments. For example, they are capable of temperature extremes not possible with permanent magnet motors (between −100° and +500° C.)

SR motors have unique features that make it very attractive for certain applications where human safety is of utmost importance, such as in the aerospace and ground transportation industry. These features are the result of the SR motor not using permanent magnets. For example, in SR motors there is no need for bi-polar current to energize each phase in order to produce torque. The stator poles magnetically attract soft iron rotor poles rather than north or south magnetized permanent magnets, resulting in no need to control the polarity of the current used for each phase. Because polarity of the current is not important, the winding is connected in series with the switching transistors, thereby eliminating the possibility of shoot-through faults in the event of a switch failure as in the case with induction motors and permanent magnet brushless motors.

The other safety-related advantage of SR motors is also due to the lack of permanent magnets. The permanent magnets generate a back electromagnetic force (EMF) during rotation of the rotor. SR motors are without this type of back EMF. This fact eliminates the possibility of a braking torque on the motor shaft in the event of a short in the circuit due to the magnetomotive force (MMF) of the magnets. In the case of a short in one of the windings, the SR motor will continue to rotate, but it will produce reduced power. The percentage of reduced power is proportional to the number of open or shorted phases relative to the total number of phases.

One of the disadvantages of increasing the number of winding phases of any electric motor is the increase in switching or commutation frequency. When a phase is energized or de-energized the time rate of change of current (dI/dt) causes eddy current losses in the lamination iron of the stator and rotor causing heating. The faster the motor rotates the greater the frequency and iron core losses.

Another loss resulting from magnetic field flux reversals is known as hysteresis loss. This heating affect also increases with the number of phases and the rotational speed. A full magnetic flux reversal from some positive flux value to some negative flux causes a "full loop" energy loss. If the flux field only increased from zero to some maximum value then when commutated "off", the field decreases back to zero again then a "minor" hysteresis loop is produced. This phenomenon of hysteresis loss and corresponding heating affects takes place during the operation of most all electric motors. The so called iron losses of all motors produces heat which must be dispatched, either through the mechanical mounting structure by conduction or by means of air or liquid cooling. The area inside the hysteresis loop is the work done or energy loss. When a full magnetic flux reversal takes place due to bipolar current switching used in induction motors and brushless motors, the magnetic iron experiences heating due to a full hysteresis loop. The SR machine experiences the losses produced by the minor hysteresis loop because the flux starts at zero, increases to the peak value then decreases back to zero rather than to a minus peak value, but the resulting iron losses are much less than in conventional SR machines.

The SR motor illustrated in my U.S. Pat. No. 4,883,999 significantly reduces the energy losses experienced in the back iron and rotor of an SR motor. Although the torque performance is very good for such SR motors, they suffer from the same limitations of conventional SR motors in that there is no clear way to drive the motor with two phases on at the same time. Such a drive scheme is highly desirable for high torque application and/or applications that require continuous positive torque in various failure modes—e.g., aerospace industry, for safety reasons. In the past, phase overlap provided added torque and added safety. When two phases are applied to a conventional SR motor in synchronism, however, the motor fails to achieve greater torque and essentially becomes a very inefficient machine (i.e., twice the input power, but no significant increase in torque), which is due to magnetic saturation of the stator yoke and a stator and rotor pole distribution that is designed for single-phase energization and ineffective for two-phase energization.

SUMMARY OF THE INVENTION

It is the general object of this invention to provide a SR motor having substantially improved performance characteristics. In this connection, it is a specific object of this invention to provide a magnetic circuit for a SR motor that has a greater efficiency and torque than switched reluctance motors of more conventional constructions, particularly with more than three stator phases and at higher speeds where the magnetic iron losses are usually the highest.

A related object of the invention is to provide a SR motor of improved efficiency without sacrificing the well-known performance advantages and features of the SR motor (e.g., low cost, robust or ruggedness, wide operating temperature and high RPM capability).

A more particular object of the invention is to substantially reduce the hysteresis and eddy current losses in the back iron portion of the rotor and stator laminated material.

It is another specific object of the invention to provide a high speed, high torque SR motor having very small torque ripple characteristics and no dead torque positions for the rotor.

Another object of the invention is to significantly increase the high rotational speed capability of the polyphase SR motor by reducing the heating loss effects normally produced by a large number of winding phases, enabling high speed applications to benefit from the advantages of the low torque ripple and no rotor dead torque positions.

A further object of the invention is to achieve the heretofore mentioned objects with a conventional symmetrical stator that can be easily wound with polyphase windings of high density without wasted air space, thereby maximizing efficiency.

Other objects and advantages of the invention will be apparent from the following detailed description and the accompanying drawings.

In my earlier invention set forth in U.S. Pat. No. 4,883,999, reversals of the flow of flux in an SR motor are eliminated so that hysteresis losses are significantly reduced relative to conventional SR motors. Moreover, the SR motor is constructed in a manner that allows for each area of the back iron of the stator to be incorporated into only one of the magnetic phase circuits formed by the motor and its drive. Such a construction greatly reduces the eddy current losses relative to conventional SR motors since the frequency of collapsing and building of magnetic fields in the back iron area of the stator is greatly reduced. This frequency is commonly referred to as the "switching frequency." By greatly reducing hysteresis and eddy current losses, the motor of the '999 patent provides an electronically commutated motor that is characterized by significantly higher efficiency than conventional SR motors, while retaining all of the advantages of these prior art motors. SR motors according to the patent are characterized by first and second members mounted for relative rotation wherein on of the members has evenly spaced poles and the other member has unevenly spaced poles such that when the poles of each member are polarized they define pairs of adjacent poles having opposite polarities.

In accordance with the present invention, an SR motor includes a stator having evenly spaced salient poles and a rotor having unevenly spaced salient poles where two phases must be energized at all times in order to provide controlled rotation of the rotor. The two energized phases are always adjacent to each other. The windings are wrapped about the poles of the stator in a manner that allows the poles of the stator to be energized as pairs of adjacent poles having opposite polarities so as to create a magnetic circuit between the poles of each pair. The primary magnetic circuit formed by each pair of poles is through the back iron area of the stator bridging the two adjacent poles, thereby assuring that the primary magnetic circuit formed by either pole in a pair is between the poles of the pair, and flux reversals in the stator are, therefore, eliminated.

An SR motor having the foregoing geometry and phase energization scheme provides an output torque that is substantially greater than a same-sized SR motor of conventional construction. The rotor of the motor provides the torque of an eight-pole rotor while providing a stroke angle of a four-pole rotor. The four-pole stroke angle allows the motor to operate at relatively high RPMs, while maintaining its high torque characteristics. Moreover, the two-phase-on energization scheme assures that substantial torque is maintained upon failure of one of the phases. Therefore, the SR motor of the invention is unlikely to stall at low RPMs and, as a result, is an excellent motor for applications where reliable operation is critical for reasons such as safety.

Furthermore, the SR motor of the invention is characterized by improved efficiency relative to conventional SR motors. By energizing the motor so that no magnetic circuits are generated that link a pair of adjacent stator poles, each area of the back iron of the stator experiences a flux flow for only one phase—i.e., no portion of the stator back iron carries flux from any more than one pole pair. Thus, the switching frequency of the flux in the back iron of the stator is equal to the commutating switching frequency divided by the number of phases. In contrast, the switching frequency of the flux in the back iron of conventional SR motors, brushless DC motors and AC induction motors is equally to the commutation switching frequency.

Since the eddy current losses of the motor are greatly effected by the flux switching frequency in the stator back iron, the magnetic circuit arrangement of this invention significantly reduces those eddy current losses. For the SR motor of the invention, the loss frequency equals the commutation frequency divided by the number of phases. For the same heating losses as a conventional SR motor, the rotational speed of the SR motor of the invention can be much greater.

By providing the uneven spacing of poles on the rotor, the energization scheme according to the invention provides torque to the rotor and allows positive control of the direction of rotor rotation. In order to provide a low reluctance path between stator and rotor, the poles of each pair of unevenly spaced poles are separated by an angle $\alpha_1$ equal to that of the evenly spaced poles of the stator. Such a relationship allows two pairs of unevenly spaced rotor poles that are positioned diametrically opposite one another to be aligned with two pairs of adjacent stator poles so as to provide a low reluctance path for the flux flowing between the poles of each pair with two phases energized. To ensure torque is generated at the rotor, the neighboring poles of adjacent pairs of rotor poles are separated by an angle $\alpha_2$ that is not equal to or an integer multiple of the angle $\alpha_1$ between the poles of a rotor pole pair.

In order to provide the foregoing energization scheme, the evenly spaced stator poles are wound with windings in a conventional manner such that each phase energizes at least one pair of windings wound about diametrically opposite stator poles. In energizing the rotor, however, adjacent stator poles of different phases are simultaneously energized in order to generate a magnetic circuit between the adjacent poles that draws a pair of similarly spaced rotor poles (i.e., angle $\alpha_2$) into a low reluctance alignment.

Various energization schemes may be employed to power an SR motor according to the invention. Using a polyphase source, the SR motor must be driven so that two phases are on at any given time. Also, the SR motor may be energized by a hybrid scheme wherein the motor is at different times driven by a different number of phases such as two phases, then three phases for a short angle and then back to two phases. Such a scheme may be realized by merely partly overlapping the on times of each phase to either increase the average output torque or to minimize the torque ripple.

Two phases energize one or more pairs of adjacent stator poles so that each pair comprises opposite poles that draw pairs of adjacent rotor poles into alignment, thus providing a low reluctance path for flux flowing between the pole tips of the polarized pair. When more than one pair of adjacent stator poles are energized at a time, the relative positions of the polarities of the poles in the pairs are preferably controlled so as to prevent the creation of "secondary" magnetic circuits linking two pairs of stator poles by way of a flux path that crosses the primary magnetic circuit of unenergized pairs of stator poles. Secondary magnetic circuits are discussed in greater detail in my '999 patent. These secondary magnetic circuits effectively increase the flux switching frequency for those portions of the stator back iron where the primary and secondary circuits overlap. To prevent the occurrence of such secondary magnetic circuits linking pairs of stator poles, the relative polarities of simultaneously polarized pairs are preferably maintained such that neighboring poles separated by unenergized pairs of poles are of the same polarity.

Depending upon the particular configuration of the SR motor and the selected drive scheme, two or more unipolar drive circuits may provide the foregoing polarization relationship between stator pairs for certain phase, stator and rotor pole arrangements.

While the invention will be described in connection with a single embodiment, there is no intent to limit the invention to one embodiment. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
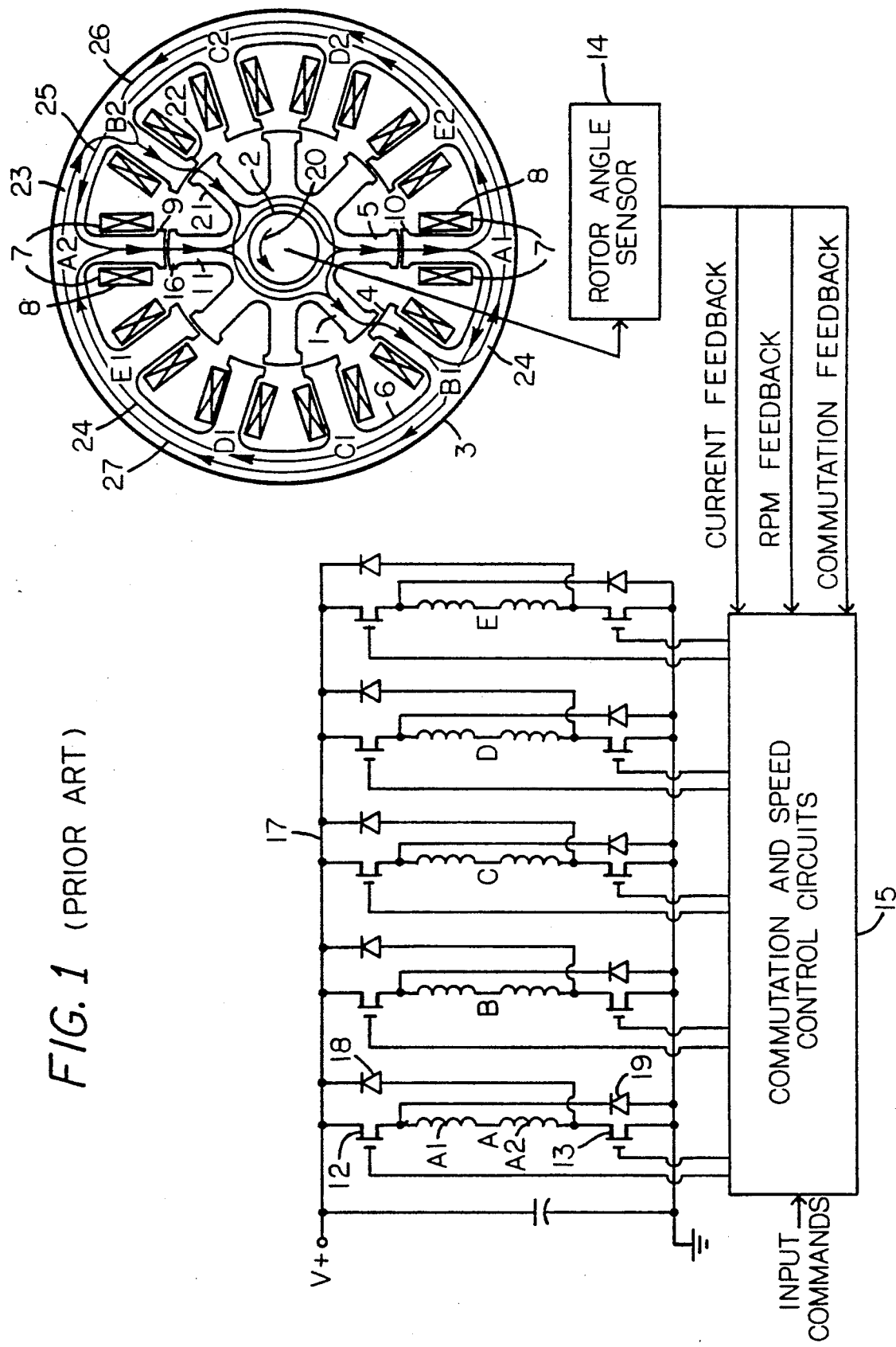
FIG. 1 a schematic cross-sectional view of a conventional switched reluctance motor construction, illustrated in a ten stator pole and eight rotor pole configuration with five phases.

Turning to the drawings and referring first to FIG. 1, a typical five phase, prior art switched reluctance motor is characterized by a rotor without windings, permanent magnets or a commutator. Because the rotor is without windings or permanent magnets, the rotor has a low inertia compared to AC or PM motors, because there is an absence of iron or magnet material near the outside diameter of the rotor. A stator which is characterized by phase windings that are of the concentrated type or wound and placed around one pole with very short end windings, a significant advantage over AC induction motor stator windings and most brushless DC and armature windings of brush type DC motors.

A rotor 1 rotates about a steel shaft 2 and is comprised of a stack of laminations made of a magnetically permeable iron alloy. As suggested by FIG. 1, each rotor lamination is cut to form a number of salient poles that extend radially outwardly from the axis of rotor rotation and are spaced about the periphery of the rotor in pairs of symmetrically spaced poles.

As with the rotor 1, the stator 3 is preferably formed by a stack of laminations made from a magnetically permeable steel alloy. In order to cause rotation of the rotor 1 as explained hereafter, the stator 3 includes a number of salient poles 4 that is unequal to the number of salient poles 5 on the rotor 1. The stator poles 4 extend radially inwardly from an annular yoke 6 and are circumferentially and evenly spaced about the yoke.

The switched reluctance (SR) motor of FIG. 1 has ten stator poles 4 and eight rotor poles 5. Windings 7 of a pair of diametrically opposite stator poles 4 are connected in series or parallel to form a phase of the winding. In the illustrated motor, there are five phases, (i.e., A, B, C, D, and E). As those familiar with SR motors will appreciate, different combinations of the numbers of stator and rotor poles may be used. As is well known in the art, the torque stroke angle $\Theta$ per commutation cycle for SR motors is given by the following relationship, $$\Theta = 360°/N\phi \cdot Nr,$$

where $\Theta$ is in degrees, $N\phi$ equals the number of stator winding phases and $Nr$ equals the number of rotor poles. For example, the five-phase SR motor with ten stator poles and eight rotor poles illustrated in FIG. 1 will result in a nominal 9° angle of rotor rotation for each commutated phase.

For identification of particular poles 4 and 5, reference hereinafter will be made to the stator pole and its winding—e.g., in FIG. 1 the stator poles of phase A are 9 ($A^1$) and ($A^2$), where $A^1$ and $A^2$ comprise the winding pair for phase A. The excitation of windings $A^1$ and $A^2$ of phase A magnetizes both the stator 3 and the rotor 1. As illustrated, the excitation produces a torque, causing the rotor 1 to align its poles 5 and 11 with the excited stator poles 9 and 10. The polarity of the torque does not depend on the polarity of the current, since the rotor 1 is always attracted to the stator 3 and will rotate to an orientation which provides a minimum reluctance path between energized poles. Consequently, the SR motor requires only unipolar current through the phase windings from a pair of power switches 12 and 13. Sequential excitation of the phase windings A, B, C, D, and E produces a one-phase-on operative that causes the rotor 1 to rotate and synchronously align its poles with the poles 4 excited on the stator 3. A shaft position sensor 14 provides rotor position information to the controller 15, which is used by the controller to initiate the switching of the stator phases at the appropriate rotor angles.

Torque in the SR motor is proportional to the flux carried by the rotor and stator poles 4 and 5 as selected ones of them rotate into alignment. Both air-gap reluctance and pole reluctance simultaneously decrease as the rotor 1 rotates into a position that is radially aligned with the energized stator poles 4. To maximize the magnetic flux in the airgap 16 between the stator and rotor poles when aligned, that gap should be manufactured as small as possible.

For phase A, when the transistors 12 and 13 of the drive 17 are closed, current builds up in the windings $A^1$ and $A^2$ under the excitation of the voltage from a power source V+. When the transistors 12 and 13 are open, the current transfers to the diodes 18 and 19, and the windings $A^1$ and $A^2$ see a reverse voltage that causes the current to collapse Pulses of current are thereby supplied to each of the phases A, B, C, D and E in sequence and, for motoring operation, each pulse causes the closest pair of rotor poles to move towards alignment with the energized stator poles.

As indicated by the arrow 2D, the rotor 1 steps around in the opposite direction to the sequence of stator pole excitations as is well known in the art. It should be noted, however, that thinking in terms of "steps" of rotor rotation is only helpful from the view point of understanding the rotation. In practice, the current pulses are controlled by the controller 17 in response to the rotor position sensor 14 to occur at specific angles $\Theta$ of the rotor. The commutation of the current is controlled to occur as specific rotor angles $\Theta$ in order to give a smooth rotational transition of a rotor pole passing an attracting stator pole (e.g., rotor pole 21 and stator pole 22) in order to ensure continuous rotation without cogging. This generally means that a phase winding is substantially de-energized before the stator and rotor poles 21 and 22 align, depending on the rotational speed due to electrical time constants.

Figure 2:
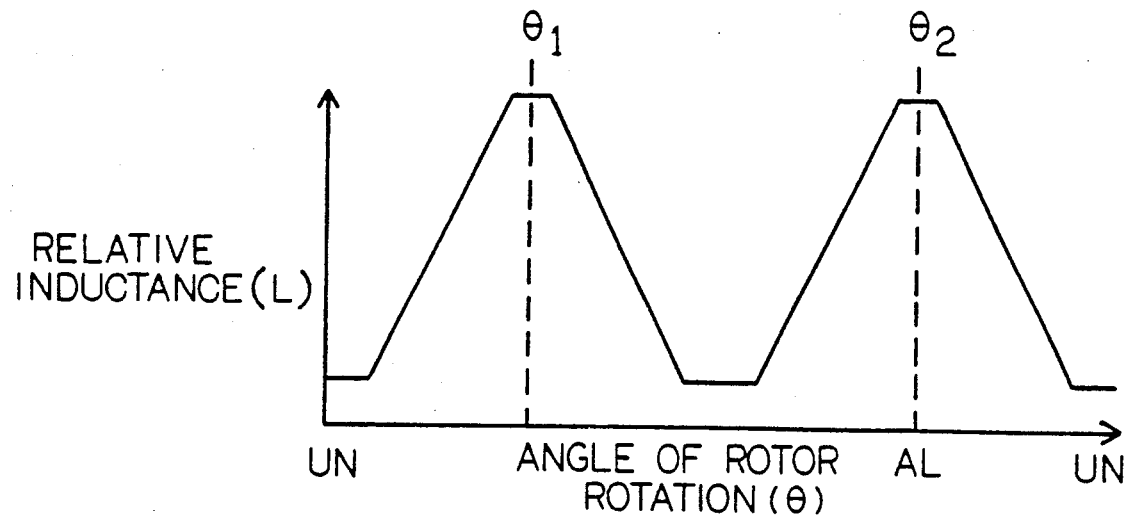
FIG. 2 is an exemplary and idealized graph illustrating a cyclic variation of inductance (L) experienced by a given phase relative to a mechanical angle $\theta$ of the rotor.

Briefly turning to a more detailed discussion of motor operation, motoring torque in a SR motor is produced if a phase is energized during the time interval when the inductance of the phase is at a minimum (i.e., a rotor poles is symmetrically unaligned to the next stator pole). A given phase undergoes a cyclic variation of inductance as rotation occurs. Making the simplistic assumption that the inductance L is independent of the current, this variation is shown in FIG. 2 for each stator pole in a phase. A first rotor pole aligns with the stator pole at a rotor angle of $\Theta^1$. With continued rotor rotation, the next alignment of a rotor pole occurs at $\Theta^2$. As can be seen, the inductance L is greatest when a rotor pole is aligned with the stator pole. In the eight pole rotor of FIG. 1, the difference $\Theta^2-\Theta^1$ equals 22.5°. The mechanical angle or rotor rotation between low inductance points is hereinafter referred to as the "stroke angle".

Figure 3:
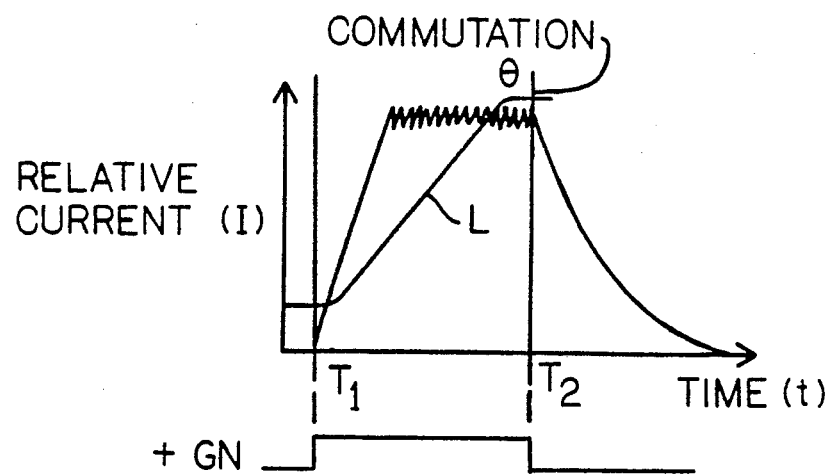
FIG. 3 is an exemplary graph of a current waveform for a given phase relative to the time (T) of mechanical rotation of the rotor, illustrating how the commutation pulse of a phase must lead the mechanical rotation of the rotor in order to ensure continuous motoring.

For continuous rotation of the SR motor in FIG. 1, the timing of a typical energizing current pulse applied to a winding relative to the rotor angle $\Theta$ is shown in FIG. 3. Energy is controllably supplied during the period up to the commutation time T, by the opening and closing of the transistors. To ensure motoring operation with no more than acceptable ripple torque, the commutation time $T_1-T_2$ occurs at a time before the mechanical angle $\theta_1$ is reached; that is, the phase winding is commutated before stator and rotor poles 4 and 5 align. Also, by commutating during a time of minimum inductance L, a maximum amount of energy may be converted to motoring and a minimum to generating. In other words, during excitation of a phase by a current I, some of the energy is converted to mechanical output, some is stored in the magnetic field and some is lost in the copper or iron. During the period after commutation, the continued rotation of the rotor 1 partly returns the energy to the supply and partly converts it to further mechanical output and losses.

The primary source of losses in an SR motor occurs in the stator 3. The losses in the stator primarily consist of hysteresis and eddy current losses. To reduce the eddy current losses, the stator 3 and rotor 1 are constructed of a laminated iron alloy as previously indicated. Eddy current losses, however, remain significant and are related to the frequency of the cyclic building and collapsing of magnetic fields in the stator. In conventional SR motors such as the motor of FIG. 1, all portions of the yoke 6 or back iron experience a cycle of building and collapsing magnetic fields in the stator is hereinafter called the "flux switching frequency." In the conventional motor of FIG. 1, the flux switching frequency in the back iron of the stator is equal to the phase switching frequency or commutation frequency.

As for the hysteresis losses, the frequency of flux reversal effects their magnitudes. Flux reversals are created when the direction of flux flow in overlapping magnetic circuits conflict. Such a conflict can occur using various drive schemes. Typically, the stator poles do not experience flux reversals. However, segments 23 or 24 of the back iron or yoke 6 of the stator 3 experience a flux reversal for each switching of the phases. Each of the rotor poles 5 may experience as many as one flux reversal per revolution.

Because of non-linearities introduced by operation of the SR motor in saturated conditions, the procedure for calculating losses in an SR motor is complex. However, an easy and quantitative comparison can be made between conventional SR motors and motors according to the invention since it is known that the flux switching frequency and the frequency of flux reversals in the yoke 6 of the stator 3 are related to eddy currents and hysteresis losses in the motor, the two primary sources of iron losses in motors. Hereinafter, these two frequencies are sometimes referred to a the "iron loss" frequencies.

With opposing stator poles 9 and 10 associated with phase A as is shown in FIG. 1, the windings $A^1$ and $A^2$ are oppositely wound about the poles so that one pole face has a north polarity and the other has a south polarity. With this configuration, the flux path is, as indicated by the solid lines 24 and 25, through the rotor 5 and around the back iron or yoke 6 of the stator 3. Upon energization of stator poles 22 and 4 ($B^1$ and $B^2$) by phase B, the associated windings will set up a flux pattern similar to the development by windings $A^1$ and $A^2$ of phase A as indicated by the other solid lines 26 and 27. For the segments 23 and 24 of the back iron or yoke 6, it can be seen that the direction of the flow of the flux reverses from phase A to B. Similar flux reversals occur in other segments of the yoke 6 when phase B is turned off and phase C is turned on. A third pair of segments of the back iron or yoke experiences flux reversal when phase C is turned off and phase is turned on. The same sequence of events is repeated for phases D and E. Collectively, the pairs of back iron segments account for the entire area of the yoke 6 during one complete revolution. The same type of flux reversal occurs during "two-phase-on" operation of the five phase switched reluctance motor in FIG. 1.

Because the flux paths for each phase extends around the entire back iron area of the yoke 6, each portion of the yoke 6 is incorporated into five flux paths—one from each phase. Accordingly, every portion of the back iron experiences a flux switching frequency equal to the commutation frequency of the motor, which is five times the commutation frequency of each phase.

For a ten pole stator, eight pole rotor arrangement as shown in FIG. 1, one complete revolution of the rotor requires four cycles of the phase sequence A, B, C, D, and E. In terms of motor RPM, each segment of the back iron or yoke 6 experiences a flux change 40 times per one complete rotor revolution and a phase reversal 40 times. Operating at 3,600 RPM, the flux switching frequency and frequency of flux reversal in the stator of FIG. 1 are 2.4 KHZ each. At 36,000 RPM, the flux switching frequency and the flux reversal frequency would be 24 KHZ. As previously indicated, these frequencies are indicative of core losses in the stator primarily related to eddy current and hysteresis losses, respectively.

In accordance with one important aspect of the invention, a motor construction and energization scheme are provided that provides substantially improved torque performance relative to conventional SR motors of the same size, while also providing improved efficiency. A five-phase SR motor constructed in accordance with the invention substantially reduces eddy current and hysteresis losses and, thereby, increases motor efficiency with respect to both conventional SR motors and SR motors made in accordance with my earlier U.S. Pat. No. 4,883,999, especially at higher RPMs (e.g., 2,000 RPM and more). In this regard, the SR motor of the invention is believed to provide high efficiency operation over a wide range of speeds, including speeds as low as several hundred RPMs and up to 50,000 RPM or greater. Like my earlier '999 patent, in order to minimize the flux switching frequency and eliminate flux reversals in at least the stator of the SR motor, adjacent stator poles are polarized so as to have opposite polarities. Unlike my earlier patent, however, the two adjacent poles are not of the same phase. In addition to the elimination of flux reversals, energizing adjacent stator poles minimizes the path length of the yoke of the stator in the magnetic circuit. By minimizing the yoke in the magnetic flux path, energy losses caused by the collapsing and building of a magnetic field in the yoke or back iron (i.e., the switching frequency) are greatly reduced because these losses are directly proportional to the iron carrying flux.

Specifically, the SR motor in accordance with the invention is energized in a manner to prevent or at least reduce (relative to conventional switched reluctance motors) the overlapping of magnetic fields in the back iron of the stator. By eliminating or reducing the occurrence of overlapping magnetic fields in the back iron, the switching frequency and frequency of flux reversals are drastically reduced because none of the yoke or back iron is shared between phases. As a result of this reduction, eddy current losses are substantially less than in a conventional SR motor.

Figure 4A:
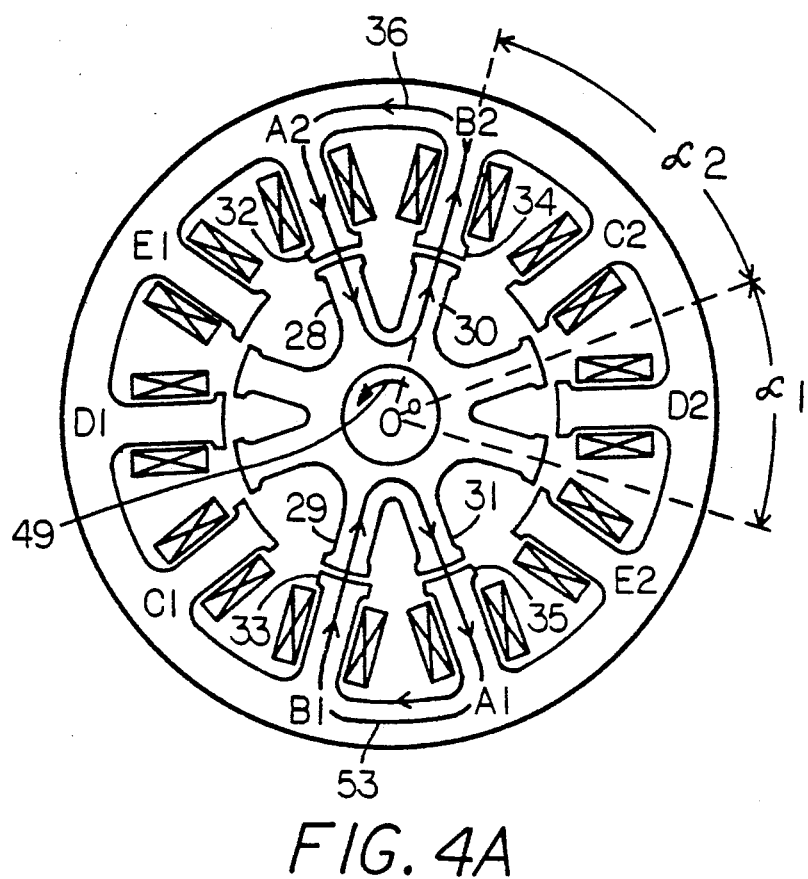
FIG. 4A is a schematic cross-sectional view of a five phase electronically commutated reluctance motor incorporating the invention, with the windings of the stator poles wound in accordance with the main embodiment and with four rotor poles aligned with the pole pairs of stator phases A and B in keeping with two phase on operation at a time.

To ensure rotation of the rotor with a flow of flux between adjacent pole pairs, the rotor poles are unevenly spaced about the rotor. Moreover, the uneven spacing allows for the control of the direction of rotor rotation. Specifically, as shown in FIG. 4A, the angle $\alpha_1$ between pairs of adjacent rotor poles forming non-overlapping magnetic circuits (i.e, inter-pair angle) and the angle $\alpha_2$ between adjacent rotor poles of different pairs (i.e., intra-pair angle) are different. Stated differently, the angle between adjacent rotor poles alternates between first and second angles $\alpha_1$ and $\alpha_2$.

For the purpose of illustrating the principle of the invention, FIGS. 4A, 4B, 4C, 4D, and 4E are exemplary of SR motors according to the invention having four pairs of salient rotor poles spaced apart at an angle $\alpha_2$ greater than the equally spaced stator poles. The SR motor according to the invention has five pairs of salient stator poles, all equally spaced, separately by the angle $\alpha_1$ and wound with windings connected to a five-phase power inverter 71 shown in FIG. 5 that switches DC current to each phase at the proper rotor positions in order to produce continuous torque in either direction of rotation.

Even though FIGS. 4A through 4E illustrate an exemplary embodiment of an SR motor according to the invention with one pair of stator poles for each of its five phases, there are other embodiments possible which would utilized more than one pair of stator poles per phase. In all embodiments of the invention, however, there are at least one pair of diametrically opposite stator poles per phases. By simultaneously energizing phases of adjacent stator poles in a manner to provide the adjacent poles with opposite polarity, the rotor with its unevenly distributed poles will rotate with a high characteristic torque.

Applicant has found that torque values can be achieved for an SR motor made according to the invention that are much greater then those of conventional SR motors operated by a two-phase-on energization scheme, while exhibiting a substantially lesser switching and iron loss frequencies. Therefore, the SR motor of the invention provides high torque at a level of efficiency not achieved by conventional SR motors. The SR motor of the invention maintains positive torque even when a phase fails because the remaining phase comprises diametrically opposite poles that form a conventional flux path.

The SR motor of the invention exhibits a reduced switching and iron loss frequency even with respect to a motor made in accordance with the '999 patent. Because of the uneven spacing of the rotor poles, the rotor rotates like a conventional rotor having a number of poles equal to the number of pairs of poles in the rotor of the invention. For example, a rotor of the SR motor of the invention may have eight rotor poles as illustrated in FIGS. 4A-4E. The eight rotor poles comprise four pairs. The rotor rotates as if it were a conventional four pole rotor, but the motor has the torque characteristics of a conventional motor with an eight pole rotor.

The embodiment of the invention illustrated in FIGS. 4A-4E uses four poles of an eight pole rotor to produce torque at any rotation interval, but the resulting pairs of two poles exhibit a stroke angle of two times of the stroke angle of the conventional SR motor with ten stator poles and eight rotor poles illustrated by FIG. 1. The commutation frequency and iron loss frequencies of the conventional SR motor in FIG. 1 is 24 KHZ at 36,000 RPM. For the SR motor illustrated in FIGS. 4A-4E, the number of stroke angles per revolution of the rotor is 20 in contrast to 40 for the conventional SR motor from FIG. 1. The resulting commutation frequency at 36,000 RPM with only 20 strokes per revolution is 12 KHZ. In addition, each portion of the stator yoke between each adjacent phase is only used one time in five strokes, which means at 36,000 RPM the switching frequency in the yoke or back iron of the stator is 2.4 KHZ or the same frequency as the conventional SR motor at 3,600 RPM (i.e., reduced by a factor of 10).

The lower losses by a factor of ten are useful at all speeds but at lower speeds the higher torque is an advantage due to the two-phases-on. The illustrated SR motor has a stroke angle of 18°, which is exactly the same as a five phase conventional SR motor with ten stator poles and four rotor poles, produces approximately twice the peak torque because of two phases on for four poles energized rather than a single phase on with two poles energized.

The process of rotor rotation in the counter clockwise direction can be understood as the phase pairs are turned on and off. For example, FIG. 4A shows phases A and B energized with the rotor poles 28, 29 and 30, 31 aligned to the stator poles 32, 33 and 34, 35 inside the phase A and B windings of two coils ($A^1$ and $A^2$, and $B^1$ and $B^2$) per phase. The windings are coiled in a direction so as to cause the polarity of the stator poles at the inside diameter air gaps to circumferentially alternate between north and south magnetization. For example, in FIG. 4A, when phases A and B are switched to the DC power source and current flows through the windings $A^1$-$A^2$ and $B^1$-$B^2$, the magnetic flux 36 flows from phase B poles to phase A poles in the direction shown because of their magnetic polarity. The resulting two flux paths between the poles of phases A and B are generated by coils $A^1$ to $B^2$ and $A^1$ to $B^2$ due to their north/south polarity. There are no secondary flux paths through the rotor from coils $A^1$ to $A^2$ or $B^1$ to $B^2$ as in the case with conventional SR motors.

Figure 4B:
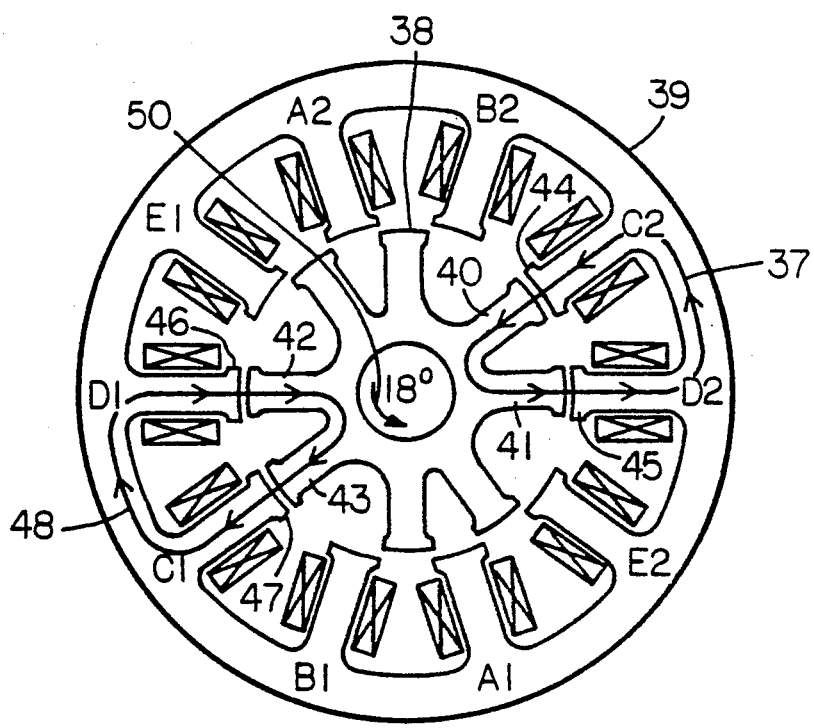
FIG. 4B is a schematic cross-sectional view of a five phase SR motor incorporating the invention with the rotor rotated counter clockwise from FIG. 4A so that the other four rotor poles align themselves with the stator pole pairs of phases C and D.
Figure 4C:
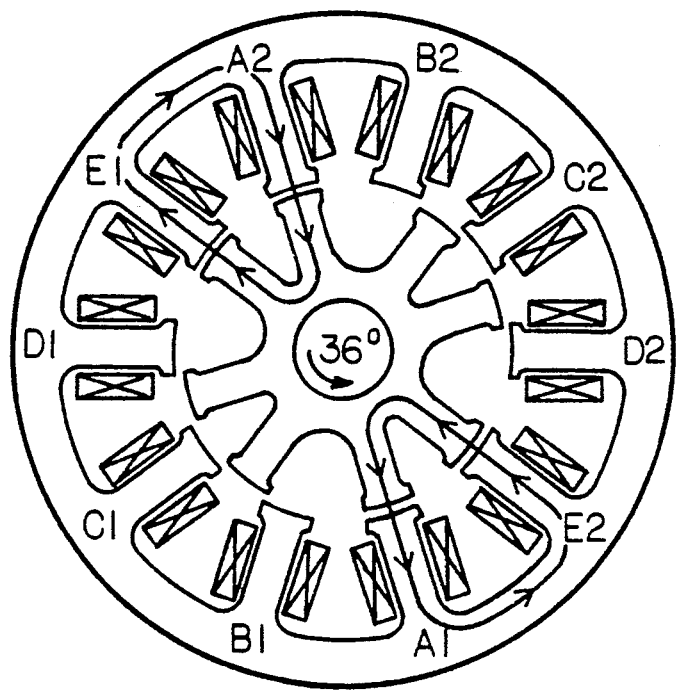
FIG. 4C is a schematic cross-sectional view of a five phase SR motor incorporating the invention with the rotor continuing the counter clockwise rotation so that the first four rotor poles align themselves with the stator pole pairs of phases E and A.
Figure 4D:
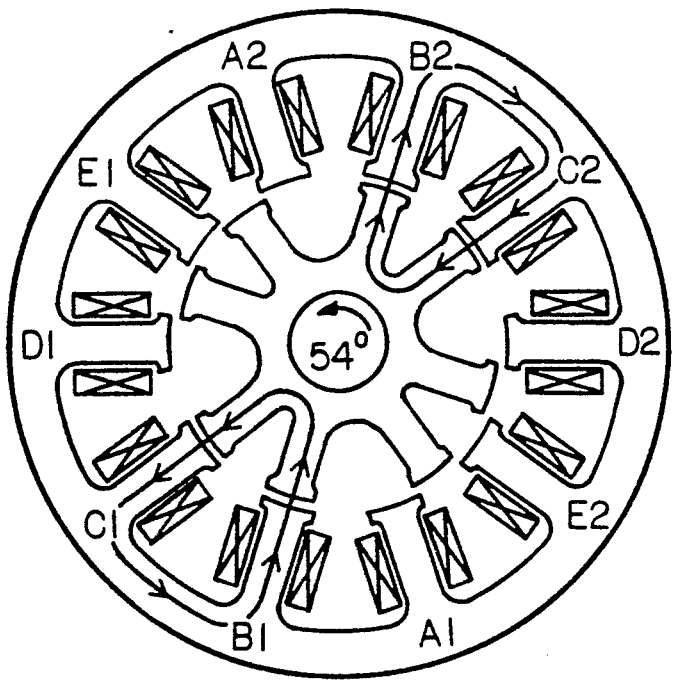
FIG. 4D is a schematic cross-sectional view of a five phase SR motor incorporating the invention with the rotor rotation continuing to the position where the other four rotor poles align themselves with the stator pole pairs of phases B and C.
Figure 4E:
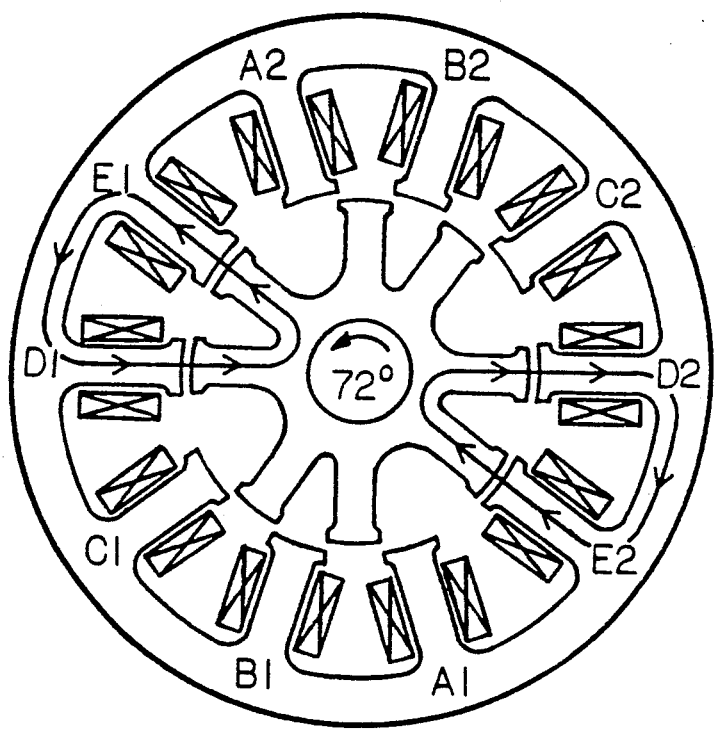
FIG. 4E is a schematic cross-sectional view of a five phase SR motor incorporating the invention with the rotor rotated counter clockwise from 4D so that the original four rotor poles are aligned with the stator pole pairs of phases D and E.

When the first two pairs of rotor poles 28, 29 and 30, 31 have nearly aligned with the four energized stator poles 32, 33, 34 and 35 of phases A and B, the power transistors in the converter 71 (FIG. 5) are opened and the power transistors connected to phases C and D are closed. FIG. 4B illustrated the flux 37 present in the rotor 38 and stator 39 with the other two rotor pole pairs 40, 41 and 42, 43 aligned to the four stator poles 44, 45 and 46, 47 with coils $C^1$, $D^1$ and $C^2$, $D^2$ wound around them. The same sort of very short flux paths 37 & 48 are generated as was the case with the energization of phases A and B illustrated in FIG. 4A.

The arrow of rotation 49 and 50 shown on the rotor indicates the counter clockwise rotation of the rotor when torque production was generated between FIG.

Figure 6:
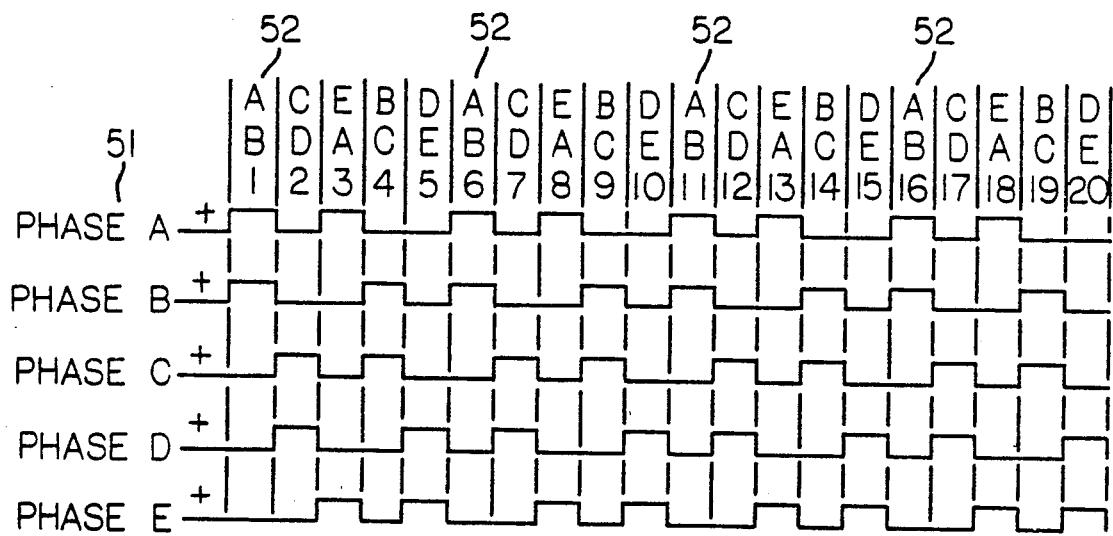
FIG. 6 is a schematic diagram of the commutation pulses required to energize the five-phase motor according to the invention to assure two phase energization.

4A and FIG. 4B. In the case of the ten stator pole and eight rotor pole illustrated embodiment of the invention, the direction of rotation of the rotor is the opposite of the stator's electrical direction of rotation. The rotor rotates counter clockwise when the phase pair windings are commutated in a clockwise direction as indicated by the energization sequence shown in FIGS. 4A-4E. The sequence illustrated rotates the rotor 72°. Five repetitions of sequence rotates the rotor a full 360°. Therefore, twenty strokes are required per mechanical revolution, where each stroke is the change in the position of the rotor from one of the FIGS. 4A-4E to the next. A complete two-phase-on commutation sequence for rotating the rotor a full 360° is illustrated in FIG. 6, showing the twenty commutation strokes of the five phases A-E, each of which takes four repeating cycles 52, with each phase on two times per cycle for a total of eight times per revolution and off three times per cycle for a total of twelve off cycles per revolution.

The switching frequency of the yoke is equal to the commutation frequency at a given RPM divided by the number of phases (i.e., the magnetic circuit in any part of the yoke changes four times per revolution rather than twenty times per revolution.) The switching frequency of the stator poles is based on eight times per revolution because of the requirement of two phases on per stroke.

Still referring to FIGS. 4A-4E, the flux containment through the rotor 38 can be compared with the conventional five-phase SR motor illustrated in FIG. 1, which shows the flux going from one stator coil $A^1$ of a phase through the entire diameter of the rotor to the diametrically opposite stator coil $A^2$ of that same phase. When phases are commutated, the rotor yoke experiences sharing of flux as it decays and builds up, as well as full flux reversals in the same manner as the stator yoke. The five-phase SR motor in FIGS. 4A-4E clearly indicates the exclusive and short flux paths 36, 37, 48 and 53 both in the rotor 38 and the stator 39.

Figure 5:
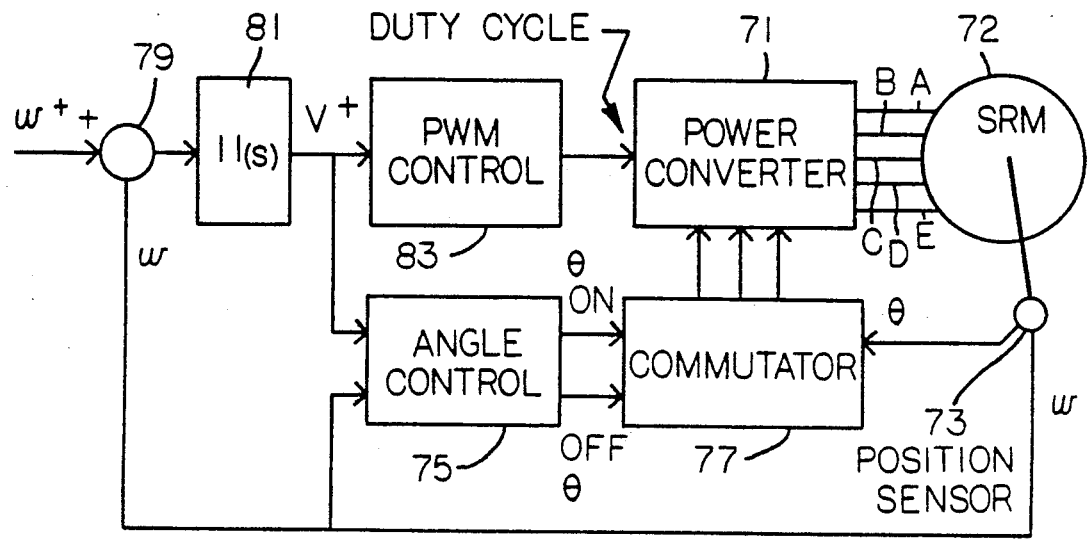
FIG. 5 is a schematic block diagram of an exemplary five phase drive apparatus for exciting the switched reluctance motor according to the invention with at least two adjacent phases energized at a time for an adjustable speed drive using constant voltage.

FIG. 5 illustrates a block diagram of a typical drive network for driving and controlling a five-phase SR motor 72 according to the invention. The drive network is conventional in design and includes a rotor position sensor 73 that delivers pulses to the angle controller 75 and commutator 77, which turn on and off the transistors in the power converter 71 for each of the pairs of phases in the two-phase-on sequence of A-B, C-D, E-A, B-C and D-E. The RPM or speed of the motor 72 is controlled by the velocity feedback that is determined by the rate of commutation pulses from the rotor position sensor 73, which is compared to an input or command value for the speed of the motor at a summation input 79. From the summation input 79, a voltage V* is developed at function block 81, which controls the duty cycle of a pulse-width modulated control 83. The voltage to the power converter 71 is adjusted using this conventional pulse-width modulation (PWM) control circuitry 83 to maintain a set speed or RPM of the motor 72.

Figure 7A:
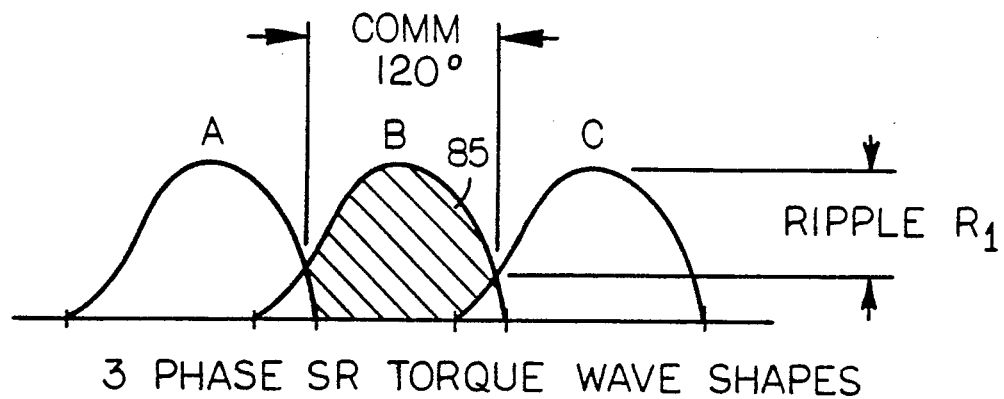
FIG. 7A is an exemplary and idealized plot of the torque wave shapes versus rotor angles at very slow speeds such as one or two revolutions per minute for conventional three-phase SR motors.
Figure 7B:
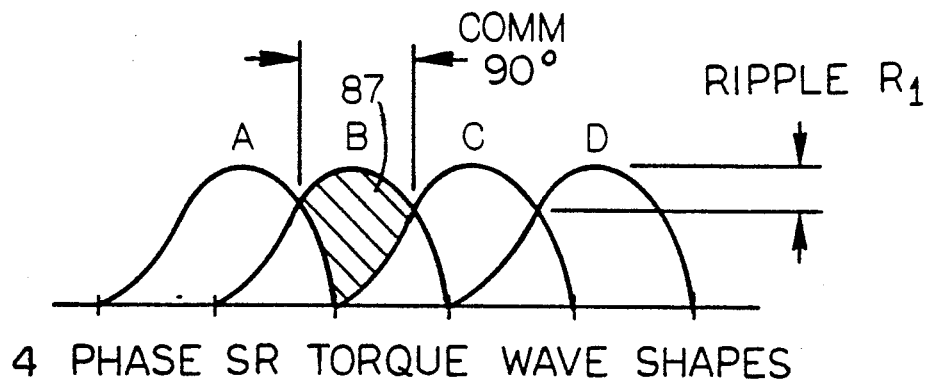
FIG. 7B is an exemplary and idealized plot of the torque wave shapes versus rotor angles at very slow speeds such as one or two revolutions per minute for conventional four-phase SR motors.
Figure 7C:
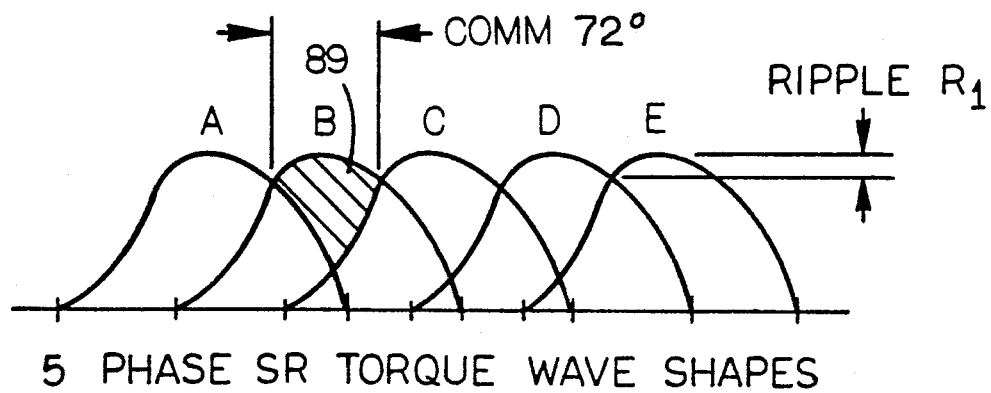
FIG. 7C is an exemplary and idealized plot of the torque wave shapes versus rotor angles at very slow speeds such as one or two revolutions per minute for conventional five-phase SR motors.

Each of FIGS. 7A, 7B and 7C illustrates an approximation of the torque produced as a function of rotor position angle for three, four, and five phase conventional SR motors with only one phase energized at a time. FIG. 7A clearly shows that if phase B is opened or shorted there is a large angle of rotor position (indicated by shaded area 85) during which zero torque is produced. If the machine is at rest and turned on, the motor will most likely try to rotate but cannot produce enough torque to start the load if phase A or C are energized. If phase B is energized, no motion will result.

FIG. 7B, however, the shaded area 87 indicates that with the phases separated by 90° (rather than 120° on the three phase) there is only one rotor position per electrical cycle where zero torque occurs if a phase fails. If a phase failure occurs during rotation, the reduced power produced is greater than that produced during rotation of a three phase machine. (75% rather than 67%).

FIG. 7C shows the torque plots per rotor position of the five-phase SR motor of FIG. 1. In this case, the phases are displaced by 72°, which results in the greatest overlap of torque per phase of the three types of SR motors illustrated by FIGS. 7A-7C. With the five-phase SR motor, there are no rotor positions where four of the five phases do not continuously produce positive torque to continue rotation. As indicated by the shaded area 89, the loss of output power (80%) with a shorted or open phase is, therefore, the least of the three phase options. Another benefit of the five-phase SR motor over the three and four-phase motors is a much lower torque ripple $R_1$, which is due to the large overlap of the torque per phase. Various combinations of commutation arrangements can be used to produce a greater torque output with one, two and even three phases on at a time.

Figure 8:
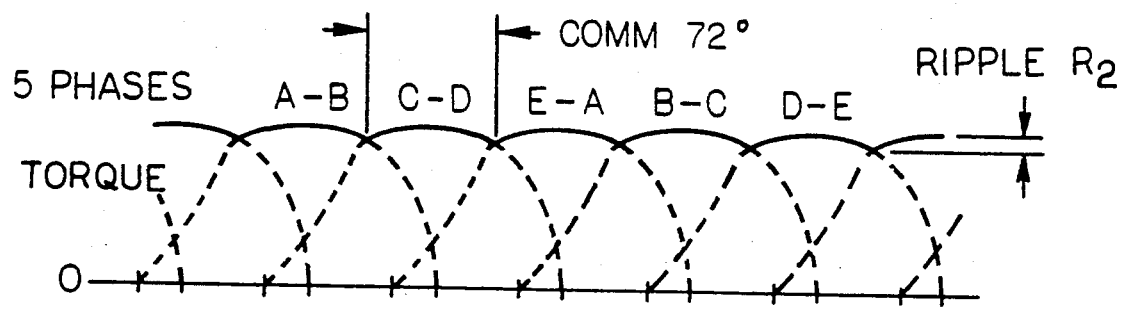
FIG. 8 is an exemplary and idealized plot of the torque wave shapes versus rotor angles at very slow speeds such as one or two revolutions per minute for the five phase SR motor according to this invention with two phases energized.

FIG. 8 is an exemplary and idealized illustration of the torque generated by the motor in FIGS. 4A-4E. In comparison to the torque generated by the conventional five-phase SR motor, the torque generated by the motor of FIGS. 4A-4E has significantly less ripple $R_2$, resulting directly from its two-phase-on operation and lamination geometry. The two-phase-on operation provides a series of overlapping torque waveforms that are substantially more trapezoidal than the waveforms of the conventional five-phase SR motor shown in FIG. 7C, which are more sinusoidal. Moreover, the motor of FIGS. 4A-4E will maintain a relative strong instantaneous torque even if one phase fails as an opened or shorted circuit since the other phase will still operate. Such a characteristic is extremely valuable for applications that require reliable delivery of torque for ensuring against a possible stall of the motor, particularly at low RPMs. The torque provided by the SR motor in FIGS. 4A-4E is approximately twice that of a same-sized conventional SR motor having 10 stator poles and four rotor poles. Of course, however, the input power required for the SR motor of FIGS. 4A-4E is approximately twice that of the conventional SR motor.

Figure 9:
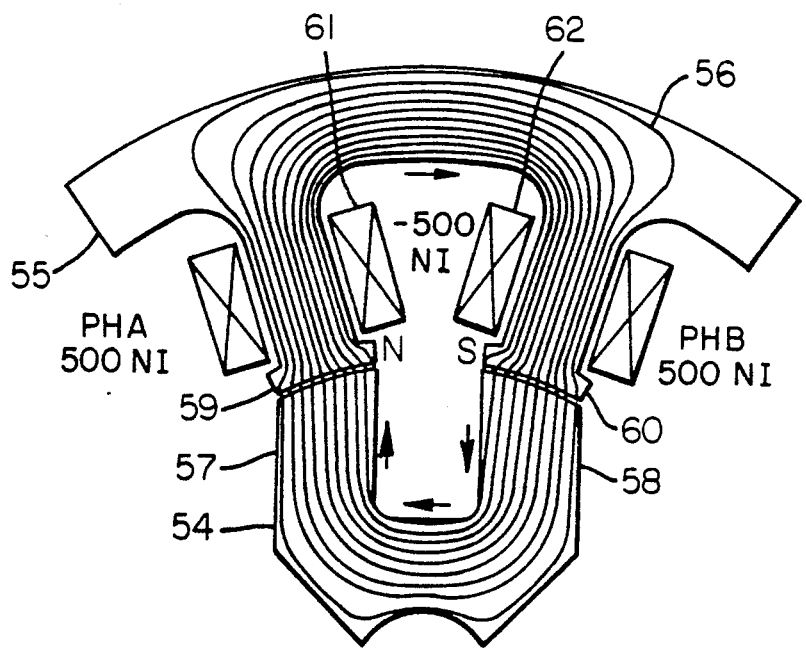
FIG. 9 is a theoretical estimation of the magnet flux contours for one pair of adjacent stator poles of a motor according to the invention, calculated using a BEM magnetic solver.

FIG. 9 is a theoretical flux contour for the motor of the invention plot computed using a boundary element magnetic solver at a particular rotor 54 to stator 55 position of pole alignment. (The BEM solver used, is called MAGNETO, and available from Integrated Engineering Software of Winnipeg, Manitoba Canada). The flux path 56 is so short between the poles 57, 58, 59 and 60 coils 61 and 62 of phase A and B that the entire cross section of the SR five phase motor need not be modeled as would be the case for a conventional SR motor which has the flux going completely through the magnetic iron from one side to the other as in FIG. 1.

Only one embodiment of an SR motor incorporating the invention has been illustrated herein. From an understanding of the illustrated embodiment, other variations will be apparent to those skilled in motor design such as other pole arrangements with other numbers of phases (e.g., 15 stator poles and 12 rotor poles, with three pairs of poles per phase), inside out versions (i.e., windings on inside stator member with an outside rotors) and also linear SR motor configurations. The important principle of all the various designs is the provision that two adjacent phases must be energized simultaneously with opposite polarity to form adjacent pole pairs in the stator to cause alignment of pole pairs on the rotor. The stator poles are equally spaced but the rotor pole pairs are unequally spaced by an angle equal to the stator poles. The rotor always contains fewer poles than the stator so that the angle $\alpha_2$ between adjacent poles of different pairs of rotor poles is greater than the angle $\alpha_2$ separating adjacent stator poles. The invention based upon the described pole arrangements assures exclusive iron paths for the magnetic flux from each phase, which greatly reduces core losses of such SR motors. Furthermore, with the correct relative assignment of polarities no secondary magnetic circuits are generated between the diametrically opposite poles of a phase. Generation of such "secondary" magnetic circuits (fully defined in my '999 patent) would share or interface with the build up of flux in other primary magnetic circuits, which contributes to core losses

I claim as my invention:

1. A switched reluctance motor driven by a polyphase source comprising in combination:
   a stator having a yoke and a plurality of salient poles evenly distributed about the yoke such that each pole is spaced from an adjacent pole by an angle $\alpha_1$;
   a rotor having a plurality of unevenly distributed poles such that the spacing between adjacent ones of the poles alternates between angles of $\alpha_1$, and $\alpha_2$;
   windings for each of the phases of the motor wound about stator poles that are circumferentially separated by at least one winding and an associated stator pole of a different phase; and
   at least two magnetic circuits formed between a pair of adjacent stator poles and a pair of adjacent rotor poles in response to the polyphase source such that each of the magnetic circuits includes a portion of the yoke bridging the pair of adjacent stator poles.

2. A motor as set forth in claim 1 wherein the polyphase source is a five-phase source and the numbers of stator and rotor poles are ten and eight, respectively.

3. A switched reluctance motor driven by a polyphase source comprising:
   a stator having a yoke and a plurality of evenly spaced salient poles distributed on the yoke such that adjacent poles are separated by an angle $\alpha_1$; and
   a rotor mounted for rotation relative to the stator and having a plurality of evenly spaced pairs of salient poles, where the spacing between adjacent poles of different pairs equals the angle $\alpha_2$ and the spacing between poles of a pair equals the angle $\alpha_1$ and the numbers of the plurality of stator and rotor poles are such that at least two pairs of rotor poles may be simultaneously radially aligned with selected ones of the poles of the stator.

4. A switched reluctance motor as set forth in claim 3 including at least three phases of windings wound about the salient stator poles such that each phase includes at least two windings wound about stator poles that are approximately diametrically opposite one another and form magnetic poles of opposite polarity.

5. A switched reluctance motor as set forth in claim 3 wherein the flux switching frequency of any portion of the yoke of the stator is less than the commutation frequency multiplied by the number of phases of the polyphase source.

6. A switched reluctance motor as set forth in claim 4 wherein the polyphase source drives the at least three phases of windings in a manner to create magnetic flux paths in the stator, which each include a unique portion of the yoke of the stator.

7. In the switched reluctance motor as set forth in claim 4, a method comprising the step of:
   energizing two phases of windings at approximately the same time in order to create adjacent pairs of stator poles having opposite polarity.

8. A switched reluctance motor responsive to a power source and comprising in combination:
   a stator having a yoke and a plurality of poles evenly distributed about the yoke;
   a plurality of windings wound about the poles such that one winding is wound about each pole;
   a plurality of phases formed by the windings such that each phase includes at least two windings associated with non-adjacent stator poles to form magnetic poles of opposite polarity when the phase is energized by the power source; and
   a rotor mounted for rotation relative to the stator and including a plurality of unevenly spaced poles such that at least two pairs of adjacent poles of the rotor simultaneously radially align with two pairs of adjacent poles of the stator to create a low reluctance path through each of the aligned pairs of rotor and stator poles and through a portion of the yoke joining the two poles of one of the stator pole pairs such that energization of two phases magnetizes the poles of each pair of stator poles to have opposite polarity and direct flux through the portion of the yoke joining the two adjacent stator poles, thereby drawing the associated pair of poles of the rotor into radial alignment with the pair of stator poles.

9. A motor as set forth in claim 8 wherein the number of phases is five and the windings are wound on the stator poles such that when energized each pole of the stator has a magnetic polarity that is opposite that of an energized adjacent pole of the stator.

10. A motor as set forth in claim 9 wherein the number of stator poles is ten and the number of rotor poles is eight.

11. A motor as set forth in claim 8 wherein the poles of each pair of rotor poles are separated by an angle $\alpha_1$, whereas adjacent poles of different pairs of rotor poles are separated by an angle $\alpha_2$.

* * * * *